United States Patent
Obst et al.

(10) Patent No.: US 12,199,493 B2
(45) Date of Patent: Jan. 14, 2025

(54) METHOD FOR DETERMINING A STATE OF AN ELECTRIC MOTOR AND A CORRESPONDING ELECTRIC MOTOR AND FAN

(71) Applicant: ZIEHL-ABEGG SE, Künzelsau (DE)

(72) Inventors: Raphael Simon Obst, Öhringen (DE); Mato Mathias Krcmar, Öhringen (DE)

(73) Assignee: ZIEHL-ABEGG SE, Künzelsau (DE)

( * ) Notice: Subject to any disclaimer, the term of this patent is extended or adjusted under 35 U.S.C. 154(b) by 428 days.

(21) Appl. No.: 17/618,654

(22) PCT Filed: May 5, 2020

(86) PCT No.: PCT/DE2020/200032
§ 371 (c)(1),
(2) Date: Dec. 13, 2021

(87) PCT Pub. No.: WO2020/249167
PCT Pub. Date: Dec. 17, 2020

(65) Prior Publication Data
US 2022/0360142 A1    Nov. 10, 2022

(30) Foreign Application Priority Data
Jun. 13, 2019   (DE) .......................... 102019208637.3

(51) Int. Cl.
*H02K 9/06*      (2006.01)
*H02K 11/20*     (2016.01)
(Continued)

(52) U.S. Cl.
CPC ............... *H02K 9/06* (2013.01); *H02K 11/20* (2016.01); *H02K 11/35* (2016.01); *H02K 5/16* (2013.01);
(Continued)

(58) Field of Classification Search
CPC ........ H02K 11/20; H02K 11/33; H02K 11/35; H02K 2209/00; H02K 2211/03;
(Continued)

(56) References Cited

U.S. PATENT DOCUMENTS 6,139,487 A  * 10/2000 Siess ................... A61M 60/237
                                                                600/16
6,469,604 B1   10/2002 Palkovich
(Continued)

FOREIGN PATENT DOCUMENTS

| CN | 2014082267 | 5/2014 |
| CN | 205280658  | 6/2016 |

(Continued)

*Primary Examiner* — Naishadh N Desai
(74) *Attorney, Agent, or Firm* — FisherBroyles, LLP; Jason P. Mueller

(57) ABSTRACT

A method for determining a state of an electric motor having a stator (2) and a rotor (3) rotatably mounted relative to the stator (2) is disclosed. Due to a rotary motion of the rotor (3), a pressure difference (p) relative to an environment (15) of the electric motor (1, 1', 1", 1''') is caused in an air space (16) inside the electric motor (1, 1', 1", 1'''). Here, in a normal state of the electric motor (1, 1', 1", 1'''), the pressure difference depends on an actual rotational speed (n) of the rotor (3). A corresponding electric motor suitable for carrying out this method is disclosed, wherein the electric motor may be part of a fan.

17 Claims, 10 Drawing Sheets

(51) Int. Cl.
*H02K 11/35* (2016.01)
*H02K 5/16* (2006.01)

(52) U.S. Cl.
CPC ...... *H02K 2209/00* (2013.01); *H02K 2211/03* (2013.01); *H02K 2213/03* (2013.01)

(58) Field of Classification Search
CPC ........ H02K 2213/03; H02K 5/16; H02K 7/14; H02K 9/06
See application file for complete search history.

(56) References Cited

U.S. PATENT DOCUMENTS

| | | | |
|---|---|---|---|
| 7,539,549 | B1 | 5/2009 | Discenzo |
| 2017/0356673 | A1* | 12/2017 | Gauss .................... F04D 29/703 |
| 2017/0363096 | A1* | 12/2017 | Fleming ............ A61M 16/0069 |

FOREIGN PATENT DOCUMENTS

| | | |
|---|---|---|
| DE | 1071836 | 6/1960 |
| DE | 2110242 | 9/1972 |
| DE | 2118084 | 10/1972 |
| DE | 2527254 | 12/1976 |
| DE | 10011266 | 9/2001 |
| DE | 10216846 | 11/2003 |
| DE | 102015207861 | 11/2016 |
| DE | 102016213755 | 2/2018 |
| RU | 2548678 C2 | 4/2015 |
| RU | 2569214 C2 | 11/2015 |

* cited by examiner

METHOD FOR DETERMINING A STATE OF AN ELECTRIC MOTOR AND A CORRESPONDING ELECTRIC MOTOR AND FAN

CROSS-REFERENCE TO RELATED APPLICATIONS

This application is a national stage entry application under 35 U.S.C. 371 of PCT Patent Application No. PCT/DE2020/200032, filed 5 May 2020, which claims priority to German Patent Application No. 10 2019 208 637.3, filed 13 Jun. 2019, the entire contents of each of which are incorporated herein by reference.

FIELD

The present disclosure relates to a method for determining a state of an electric motor having a stator and a rotor rotatably mounted relative to the stator. Furthermore, the disclosure relates to a corresponding electric motor and a fan.

BACKGROUND

The operating behavior of an electric motor and its life expectancy depend on many factors. An important factor is the temperature that occurs in the electric motor, on components of the electric motor and/or on its surface. Thus, the temperature has a direct influence on the life expectancy of the rotor's bearings. The service life of the bearings depends to a large extent on the remaining lubricating properties of the bearing grease. An increase in the bearing temperature by 10 Kelvin already results in a halving of the life expectancy of the bearing, since at higher temperatures and the associated lower viscosity of the bearing grease, lubricant can leakage out of the bearing more easily. Electronic components can also be affected by overtemperature. Therefore, in the case of electric motors, it is important to ensure that the electric motor is adequately cooled.

In many cases, it is important for adequate cooling that ventilation effects caused by rotational movement of the rotor relative to the stator result in sufficient air movement. Particles, for example dust, can accumulate in the electric motor, especially in operating environments with a high proportion of impurities, for example in agriculture. On the one hand, these weaken the ventilation effects, or bring them to a complete standstill. On the other hand, however, the cooling behavior caused by natural convection, especially at the cooling fins of the stator, is also negatively influenced. In this way, the cooling of the electric motor can be impaired to such an extent that premature failure of the electric motor is to be feared.

In another scenario that can lead to premature failure of the electric motor, there is a leak. If electronics are located in the electric motor, they should be sufficiently sealed against influences from an environment surrounding the electric motor, for example, to prevent corrosion or short circuits due to moisture penetration. If the necessary tightness of an electronics housing is no longer present due to damage to an end cover, an insufficient screw connection of a cover or another leakage location, penetrating moisture can destroy the electronics arranged in the electronics housing and thus the electric motor. In addition, the ventilation effects can also be negatively influenced here, since the moving air no longer takes defined paths.

Neither of the above scenarios can be reliably detected with the methods known from practice. However, this is desirable in order to be able to initiate preventive measures, such as maintenance or cleaning of the electric motor. Furthermore, this state information could improve a prediction of the expected lifetime of the electric motor.

Methods are known from DE 10 2018 211 838 A1 for detecting imbalances in a fan, for example as a result of dirt adhering to the impeller. These imbalances also allow certain conclusions to be drawn about contamination of the electric motor as a whole. However, these methods can only be used if buildup actually leads to an imbalance. Contamination that does not create significant imbalances and significantly impede ventilation effects of the rotor are not detectable. Even if imbalances occur, the correlation with the actual contamination of the electric motor can only be approximately determined based on empirical values. These methods are not designed to detect leaks.

SUMMARY

The present disclosure is therefore based on the task of designing and further developing a method, an electric motor and a fan of the type mentioned above in such a way that a reliable determination of a state of the electric motor is possible with little effort.

According to the present disclosure, the preceding object is solved by the features of claim 1.

Thereafter, the method utilizes an effect according to which a pressure difference relative to an environment of the electric motor is caused in an air space within the electric motor due to a rotational movement of the rotor, wherein in a normal state of the electric motor the pressure difference is dependent on an actual rotational speed of the rotor. The method includes the steps:

Determining an actual pressure difference between the air space and an environment of the electric motor, Determining the actual rotational speed of the rotor and Calculating a parameter based on the actual pressure difference and the actual rotational speed. resulting in a parameter representative of the state of the electric motor.

With regard to an electric motor, the preceding object is solved by the features of claim 10. According to this, the electric motor comprises a stator, a rotor mounted rotatably relative to the stator, and an air space formed inside the electric motor, wherein the rotor, in a normal state of the electric motor, causes a pressure difference in the air space relative to an environment of the electric motor as a result of its rotational movement, wherein the electric motor additionally comprises a pressure sensor system, a rotational speed detection system and an evaluation unit, wherein the pressure sensor system is designed to determine an actual pressure difference between an environment of the electric motor and the air space, wherein the rotational speed determination system is designed to determine an actual rotational speed of the rotor and wherein the evaluation unit is designed to determine a state of the electric motor based on the actual pressure difference and the actual rotational speed.

With regard to a fan, the preceding object is solved by the features of claim 17. Thereafter, the fan at issue includes an electric motor according to an arrangement and an impeller coupled to the rotor of the electric motor.

According to the disclosure, it has first been recognized that ventilation effects caused by a rotational movement of the rotor do not merely result in an air movement to favor the cooling of the electric motor. Rather, the ventilation effects usually also cause the air pressure to be affected in various areas within the electric motor. As a result, at least in areas within the electric motor—hereinafter also referred to as the air space—a pressure difference is created relative to an environment of the electric motor that is representative of the extent of the ventilation effects. From this pressure difference, conclusions can be drawn about a state of the electric motor.

According to the disclosure, a pressure sensor system is used to determine an actual pressure difference in the air space inside the electric motor relative to an environment of the electric motor. The air space is an area within the electric motor in which a rotary motion of the rotor of the electric motor causes the pressure difference described above. This pressure difference depends on an actual rotational speed of the motor in a normal state, where the normal state can be a state of a brand new and clean electric motor. Therefore, the actual rotational speed is determined in which the actual pressure difference has been determined. Based on the determined actual pressure difference and the determined actual rotational speed, a parameter is calculated that is representative of a state of the electric motor. This parameter can describe, for example, "how far" the state of the electric motor is from a normal state or how much false air is drawn through the electric motor. In this way, a method and an electric motor are created that enable state determination with little additional effort.

The pressure difference in the air space will depend not only on the actual rotational speed, but also on the design of the engine and the location of the air space. For example, the air space may be an area within the electric motor from which air is drawn out by the ventilation effects. In this case, a negative pressure will develop in this air space. However, the air space may also be formed at a location within the electric motor into which the ventilation effects push air. In this case, a negative pressure will develop in this air space. Both cases can be used in connection with the teaching according to the disclosure, as long as the pressure difference is sufficiently large to be measured with reasonable effort.

The term "environment of the electric motor", relative to which the pressure difference is to be determined, is generally understood to mean an area outside the electric motor which, in the most favorable case, is not influenced, or at most only slightly influenced, in terms of air pressure by the electric motor or by the system in which the electric motor is operated (for example, a fan). Thus, this "environment" should not be in the area of influence of a cooling wheel or directly at an air outlet of the electric motor. At the same time, this area should not be "too far" from the electric motor, so that a determined air pressure of the environment can also form a representative value when determining the pressure difference. Therefore, this area should preferably be no further than 100 meters, particularly preferably no further than 50 meters, and most preferably no further than 10 meters from the electric motor. There may be an exception to this definition if the electric motor is part of a fan and this fan also influences the air pressure inside the electric motor by passing air. In this case, the "environment of the electric motor" may be in the immediate vicinity of the electric motor, i.e. less than 50 cm from an outer surface of the electric motor, preferably less than 20 cm, more preferably less than 10 cm. Since the impeller of this fan can have an influence on the environment pressure or the pressure in the running chamber inside the electric motor, the influence of the impeller can be calculated out. For this purpose, for example, a model of the fan can be used, such as a digital twin as described in DE 10 2019 201 409 A1 or DE 10 2019 201 412 A1.

In principle, a method according to the disclosure can be used for the determination of a wide variety of states. It is important to note that the states to be determined have an effect on pressure ratios inside the electric motor and thus cause a pressure difference in the air space inside the electric motor. This is especially the case when the states have an impact on ventilation effects within the electric motor. A state to be determined may indicate a leakage at a normally sealed location of the electric motor, if the leakage has an effect on the pressure in the air space. In another embodiment, the state to be determined may indicate an influence on flow channels within the electric motor. This can be caused by contamination, such as dust or other adhering dirt. However, it would also be conceivable for icing or contamination (for example, from aspirated leaves) at an air inlet to constitute such an influence.

Sufficient information about the state of an electric motor can already be read from the parameter. For example, this parameter can indicate that the electric motor is "7% dirty" or "90% clean", to name just two possible statements of the parameter as examples. This parameter can be output to higher-level systems, for example, to be used as a pollution level in a thermal model. However, the parameter can—in a further development—also be used to classify the state of the electric motor into some kind of state category, for example "normal state", "slightly dirty", "heavily dirty" or "leaking", to name some possible state categories. In this further embodiment, the parameter would be compared to a threshold value and a state category or generally a state of the electric motor would be determined based on a result of comparing the parameter to the threshold value. Multiple threshold values can also be used so that multiple states can be detected and distinguished from each other.

The threshold value and the comparison with it can be realized in various ways. The design essentially depends on which state is to be determined and how the parameter is calculated. It is conceivable, for example, that the parameter indicates a degree of contamination of the electric motor and that the threshold value specifies up to which pressure difference an electric motor is to be regarded as being in the "normal state" and above which pressure difference the electric motor is to be regarded as "dirty" or "heavily dirty". In another embodiment, the parameter may indicate the "distance" from an initial parameter determined during commissioning or final testing of the electric motor after its production. In this case, the threshold value can indicate what distance from the "normal state" can be considered acceptable and at what distance countermeasures should be taken. If an undesired leakage is to be determined as a state, the rotational speed dependence of the parameter can be evaluated. If the parameter does not change or changes only insignificantly with a change in rotational speed, i.e. the change in the parameter remains below a threshold value at different rotational speeds, the "leaking" state can be concluded.

The threshold value can be given as a constant and predefined value. However, it is also conceivable in a development that the threshold value is adjusted based on further framework conditions. For example, the installation position of the electric motor has an influence on the cooling of the electric motor and can therefore be used for threshold value adjustment. In addition, for example, the load or, generally speaking, the operating point of the electric motor also has an influence on the temperature inside the electric motor. If the electric motor is only loaded with a low load torque, less waste heat is generated, which can then still be dissipated sufficiently well even if the electric motor is relatively dirty. If the electric motor is loaded with a relatively large load torque, even slight contamination of the electric motor can lead to a thermal overload of the electric motor. Therefore, the operating point of the electric motor can be used to adjust the threshold value(s). A thermal model of the electric motor can be used for this threshold value adjustment. In general, threshold value adjustment can be performed using a digital twin, such as described in DE 10 2019 201 409 A1 or DE 10 2019 201 412 A1.

The parameter can be realized in various ways. Since a dependence of the pressure difference on the rotational speed is used, it is important that the parameter has a dependence on the actual pressure difference and the actual rotational speed. What this dependence looks like in concrete terms is in principle not decisive for the method according to the disclosure. Linear correlations can be a suitable parameter as well as polynomial or exponential correlations, quotients or combinations of different correlations. In addition to the actual pressure difference and the actual rotational speed, other variables can be used in the parameter, such as pressure differences measured at an earlier time during operation of the electric motor or a pressure characteristic curve of the electric motor. In principle, it is even conceivable that the electric motor is operated at a test rotational speed, for example 1000 revolutions per minute, and that the parameter is then essentially reduced to the actual pressure difference. In a particularly preferred embodiment, the parameter is calculated as the quotient of the actual pressure difference and the square of the actual rotational speed.

In a further development, the parameter can be standardized to a reference value. In this way, a parameter can be created that lies within a predefined range, for example between 0 and 1 or 0% and 100%. The reference value can be a fixed numerical value. However, it is also conceivable that the reference value has a dependence on the rotational speed of the electric motor, in which case it is appropriate if the reference value and the parameter have the same dependence on the rotational speed. The reference value can be obtained in different ways. In this way, a brand-new electric motor of the same type can be measured on a test bench and a rotational speed-dependent reference value can be generated by recording the pressure difference together with the respective rotational speed. If the reference value is a single numerical value, the reference value may be formed by determining the pressure difference at a specific rotational speed, such as the rated rotational speed of the electric motor.

In an embodiment of the use of a reference value, this is determined during an initial commissioning of the electric motor and/or during a final test after the electric motor has been manufactured, wherein the electric motor in this embodiment is the electric motor in which a method according to the disclosure is carried out. This design offers the advantage that copy scattering of electric motors of the same type does not influence the reference value. In many cases, this design results in practically no additional effort, or at most only a small amount, since very many electric motors are checked anyway after production and/or during initial commissioning for compliance with a target behavior, for example the run-up behavior, vibration resistance, balance quality or energy absorption.

In principle, it is irrelevant for the method according to the disclosure in which way the actual pressure difference is determined. It is essential that the pressure difference between the air space inside the electric motor and an environment of the electric motor can be specified. It is possible that a pressure value representative for the inside of the air space and a pressure value representative for an environment of the electric motor are measured and put into a relation to each other. However, it is also conceivable that the actual pressure difference is determined directly with a differential pressure sensor. Generally, the pressure values refer to an air pressure.

If an air pressure is determined in the air space, this can be done by placing a pressure sensor inside the air space. In particular, if the air space is formed by an electronics housing and electronics are arranged in this electronics housing anyway, the pressure sensor can be integrated on the electronics. However, it is also conceivable that a pressure line connects the air space with a measuring space so that approximately the same air pressures occur in the air space and the measuring space. The actual pressure measurement then takes place in the measuring room. This embodiment offers the advantage that a pressure sensor can also be arranged outside the electric motor and that existing electric motors can thus also be easily retrofitted for a method according to the disclosure.

In a particularly simple embodiment, the environment air pressure is estimated. This can be done by measuring an environment air pressure, for example at an initial setup, or by calculating an air pressure value as an average of different air pressures at different times at the setup location. The environment air pressure may be measured during or close in time to the measurement of the air pressure in the air space.

In one embodiment of the determination of the actual pressure difference, a single absolute pressure sensor is used to detect pressure values at different rotational speeds of the electric motor, wherein these pressure values represent air pressures present within the air space. In this embodiment, the pressure sensor system is formed by an absolute pressure sensor and a rotational speed-dependent calculation unit. This embodiment is particularly useful in dynamic operation of the electric motor, i.e. in application scenarios in which the electric motor is operated within a time window, for example within a few seconds, a few minutes, 15 minutes or one hour, at at least two, clearly different rotational speeds, for example standstill and 1,000 revolutions per minute or 100 and 2,000 revolutions per minute. Two effects are exploited in the case: First, environment air pressure usually changes slowly, so a measurement of environment air pressure for a period of time is sufficiently accurate for the current environment air pressure. Secondly, due to the rotational speed dependence of the actual pressure difference, the air pressure in the air space will approach the environment air pressure the lower the rotational speed. Therefore, a first measurement is preferably carried out when the electric motor is at a standstill (i.e. rotational speed of the motor equal to 0 or at least approximately 0) and a second measurement is carried out at a rotational speed not equal to 0, wherein the second measurement must preferably, but not necessarily, take place after the first measurement. The measured value in the first measurement can then be equated to an environment air pressure, so that an actual pressure difference can be determined by comparing the measured value from the first measurement and the measured value from the second measurement. For the second measurement, the rotational speed should be sufficiently high to produce a measurable pressure difference.

The first measurement and the second measurement may be separated by no more than 3 hours, no more than 1 hour, or even no more than 30 minutes. The choice of the time distance between the first and second measurement can be made dependent on the application scenario of the electric motor. For example, if the electric motor is operated in a largely enclosed space, the environment air pressure is likely to be subject to only minor changes and the time distance between the first and second measurements can be selected to be large. If the electric motor is used in an area where the environment air pressure is affected by opening doors, windows or airlocks, by strongly changing temperatures or by other effects, shorter time distances are recommended. In this case, a time distance of less than 30 seconds, for example between 5 and 20 seconds, may be suitable.

In another embodiment of the determination of the actual pressure difference, two absolute pressure sensors are used. Here, a first absolute pressure sensor is subjected to an air pressure in the air space and a second absolute pressure sensor is subjected to an air pressure representative of a pressure in an environment of the electric motor. In this way, the actual pressure difference can be formed by subtracting the measured values of the first and second absolute pressure sensors. The first and second absolute pressure sensors thus form a pressure sensor system.

In another embodiment of the determination of the actual pressure difference, a differential pressure sensor is used as the pressure sensor system. In this case, a first sensor surface of the differential pressure sensor is subjected to an air pressure prevailing within the air space and a second sensor surface of the differential pressure sensor is subjected to an air pressure prevailing in the vicinity of the electric motor. Suitable differential pressure sensors are known from practical experience. This design offers the advantage that the actual pressure difference is directly available as a measured value and usually no calculation steps are necessary to determine the actual pressure difference.

In principle, the actual pressure difference and/or the calculated parameter can be determined at a single point in time and used to draw conclusions about the state of the electric motor and initiate any countermeasures. However, it is also conceivable that several actual pressure differences and/or several parameters are determined in order to avoid misjudgements and incorrect determinations, and that the state of the electric motor is determined based on an averaged actual pressure difference and/or an averaged parameter.

An electric motor according to an embodiment of the disclosure includes a stator, a rotor rotatably mounted relative to the stator, and an air space formed within the electric motor. Due to its rotary motion, the rotor creates a pressure difference in the air space inside the electric motor compared to the environment surrounding the electric motor. In particular, the pressure difference is formed when the electric motor is in a normal state. This normal state may, for example, be real or may have existed during initial commissioning. The electric motor according to the disclosure additionally comprises a pressure sensor system, a rotational speed determination system and an evaluation unit, wherein the pressure sensor system is designed to determine an actual pressure difference between an environment of the electric motor and the air space. The rotational speed determination system is designed to determine an actual rotational speed of the rotor, wherein the actual pressure difference and the actual rotational speed are determined simultaneously or at least promptly (for example within a tenth of a second or within a few seconds). The evaluation unit is designed to determine a state of the electric motor based on the actual pressure difference and the actual rotational speed. The electric motor according to the embodiment may be designed to carry out the method according to the disclosure.

In principle, it is irrelevant for a method according to the disclosure and an electric motor according to the disclosure in which way the actual pressure difference is caused. Already the air movements generated by the rotating rotor bell, depending on the motor type with magnets or a rotor winding package, can be sufficient to cause a measurable pressure difference. In a further development, however, the actual pressure difference is caused by a cooling wheel that is coupled to the rotor, so that rotation of the rotor results in rotation of the cooling wheel (usually at an identical rotational speed). Such a cooling wheel conveys air from the environment of the electric motor through the stator and/or rotor of the electric motor and thereby provides for a cooling of the electric motor. A relatively large volume of air is moved through such a cooling wheel, resulting in a readily measurable actual pressure difference.

Alternatively or additionally, the actual pressure difference in the air space can be influenced by an air outlet of the electric motor, wherein the air outlet can be designed with stator-rotor ribs and/or a labyrinth gap. The freer the air moved by ventilation effects can leave the electric motor at the air outlet, the better the electric motor can be deheated. The more this air movement is impaired, for example by an increasing degree of pollution, the more the cooling is impaired. It has been shown that this air outlet, or the degree to which air can freely leave the electric motor, also has an effect on the actual pressure difference in the air space.

In principle, the air space can be formed at a wide variety of locations on the electric motor. As long as ventilation effects of the electric motor cause a sufficient pressure difference in the air space, this air space can in principle be used for state determination. The air space may be formed in an electronics housing formed in or on the electric motor. This electronics housing may be formed on a stator bushing of the electric motor.

In principle, the electric motor can be expanded in various ways and/or different technologies can be used. It is important that a rotor be mounted for rotation relative to a stator and that movement of the rotor produce sufficient ventilation effects to create a pressure differential in an air space. In an embodiment, however, the electric motor according to the disclosure is an electronically commutated motor (EC motor) and/or an external rotor motor.

To use the state information obtained, the electric motor can have a communication unit that is designed to send state information obtained by means of the evaluation unit to a management unit. The communication unit can be designed in a wide variety of ways and a wide variety of communication standards and technologies can be used for data transmission. Digital transmission technologies can be used as well as analog ones. The transmission can be wired or wireless. Parallel or serial transmission interfaces can be used. The transmission can be packetized or in direct connections. By way of example only, but not limited to these, reference is made to the use of Bluetooth, Bluetooth LE (Low Energy), NFC (Near Field Communication), Ethernet, RS485, Modbus, Profibus, CAN bus or USB (Universal Serial Bus).

The management unit can also be constructed in various ways and form a system together with one or more electric motors. The management unit may be located locally (for example, within 50 meters of the electric motor) or remotely (for example, several kilometers away). The management unit may be configured to issue a warning message when a predetermined state is reached, initiating, for example, maintenance or cleaning of the electric motor. The management unit may be part of an Industrie 4.0 environment.

A memory can be arranged in the electric motor, which is designed to store obtained state information and/or parameters and/or further variables derived therefrom. To fill this memory, a storage of obtained data can be made with each state determination. Thus, the state determinations can be triggered periodically, for example, each time an hour, 12 hours, a day, a week or a month has passed. The distance is likely to depend on the rotational speed of the expected changes of state. The information stored in the memory can be used to form a time curve, which in turn allows conclusions to be drawn about the nature of a change in state.

The electric motor according to the disclosure can be part of a fan. Here, an impeller of the fan is coupled with the rotor of the electric motor.

There are now various ways in which the teachings of the present disclosure can be advantageously embodied and further developed. For this purpose, reference is made on the one hand to the claims subordinate to the subsidiary claims and on the other hand to the following explanation of exemplary embodiments of the disclosure with reference to the drawings. In connection with the explanation of the exemplary embodiments of the disclosure with reference to the drawing, general embodiments and further developments of the teaching are also explained.

DETAILED DESCRIPTION OF THE DISCLOSURE

Figure 1:
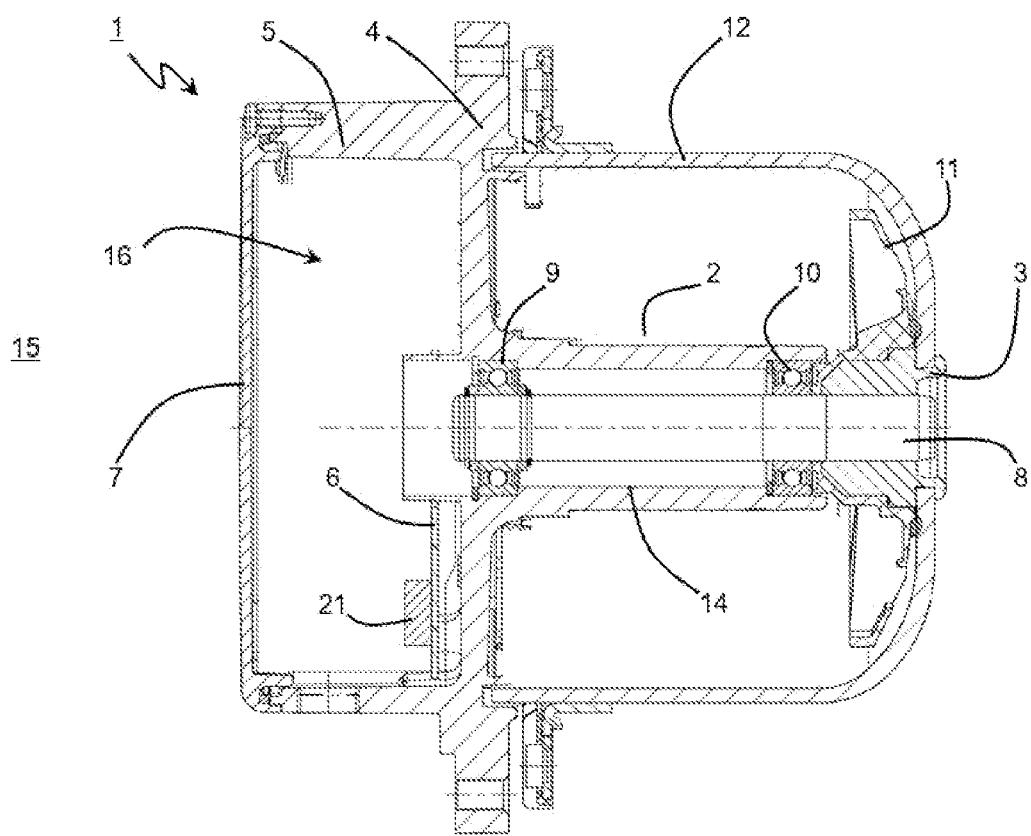
FIG. 1 a section of a first exemplary embodiment of an electric motor in external rotor design according to the disclosure with an absolute pressure sensor arranged in an electronics housing, FIG. 2 the section according to FIG. 1 with additional arrows drawn in to illustrate air movements, FIG. 3 a diagram of a pressure difference as a function of rotational speed for different states of an electric motor, FIG. 4 a section of a second exemplary embodiment of an electric motor in external rotor design according to the disclosure with a differential pressure sensor in a first embodiment, FIG. 5 a section of a third exemplary embodiment of an electric motor according to the disclosure in external rotor design with a differential pressure sensor in a second embodiment, FIG. 6 a section of a fourth exemplary embodiment of an electric motor in external rotor design according to the disclosure with a pressure sensor arranged outside the electric motor via a pressure line, FIG. 7 a section through a modification of the exemplary embodiment according to FIG. 6 with an external differential pressure sensor, FIG. 8 a block diagram showing basic functional elements of a circuit for implementing an exemplary embodiment of the method according to the disclosure, FIG. 9 a diagram showing an example of a time curve of a parameter characterizing a state of the electric motor.

FIG. 1 shows a section of a first exemplary embodiment of an electric motor according to the disclosure, which is in external rotor design. For the sake of clarity, some parts are omitted that are not important for understanding the disclosure, for example the winding packages for the stator and rotor and most of the motor electronics. The electric motor 1 comprises a stator 2 and a rotor 3, which—as already mentioned—are only indicated. The stator 2 is arranged around a stator bushing 4. An electronics housing 5 is formed on the stator bushing 4, in which motor electronics 6 are arranged (only indicated in FIG. 1) and which is closed with an end cover 7. The rotor 3 is mounted for rotation around a motor axis 8 by means of two bearings 9, 10. A cooling wheel 11 is coupled to the rotor 3, which conveys air through the electric motor 1. A motor housing 12 encloses the electric motor and is inserted in a labyrinth gap which is thereby created at the stator bushing 4.

Figure 2:
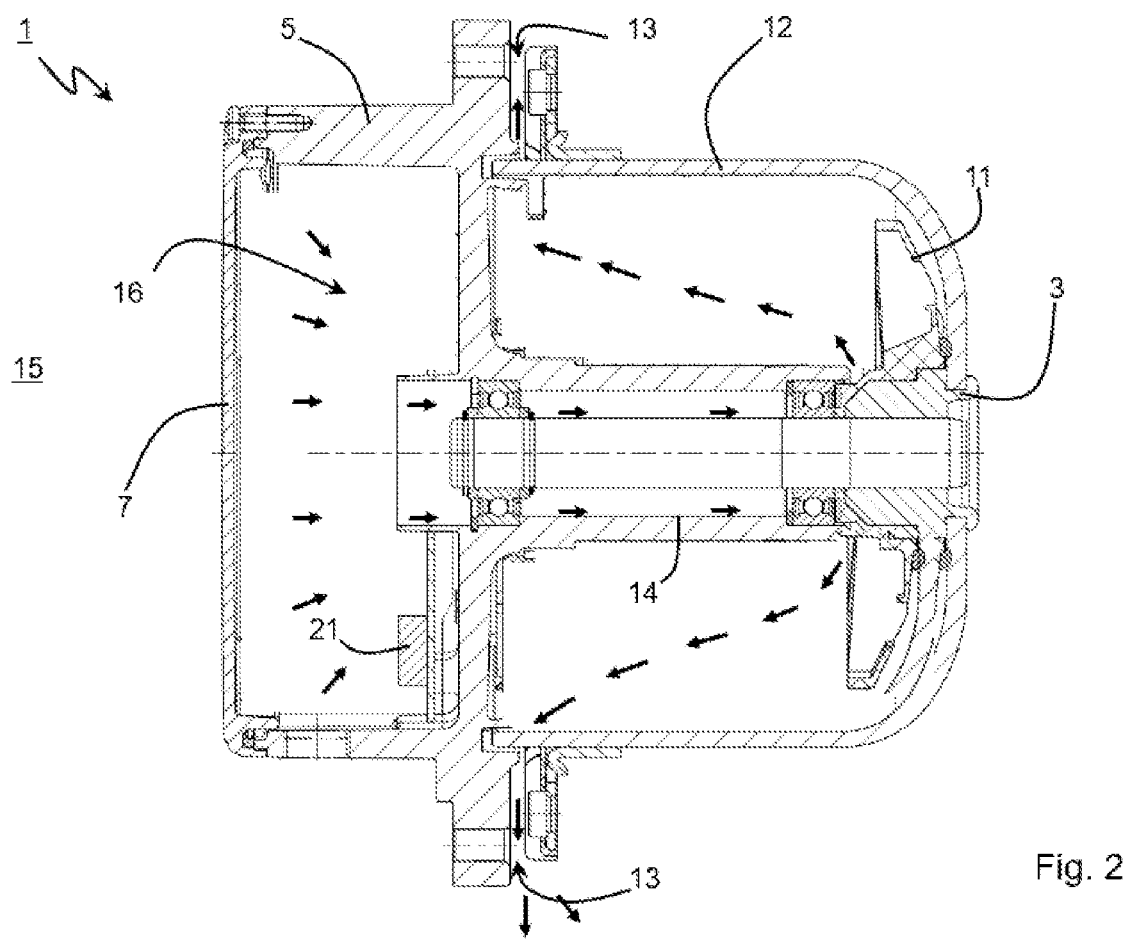

FIG. 2 shows how the air will move when the rotor 3 rotates. The cooling wheel 11 conveys air through the electric motor 1, wherein the air leaves the motor housing 12 at the area 13 which is rotationally symmetrical with respect to the motor axis 8. Among other things, the rotary motion of the cooling wheel 11 causes air to be drawn from the electronics housing through a bearing tube 14 formed in the stator bushing and conveyed to the area 13. Since the end cover 7 seals the electronics housing 5 from the environment 15, a pressure difference is created in the electronics housing 5, in this case a negative pressure. This negative pressure depends on the rotational speed n of the rotor. The greater the rotational speed, the greater the negative pressure. This negative pressure depends on how unhindered by ventilation effects air can be moved in the electric motor 1 and how unhindered the air can leave the electric motor 1 at area 13. Thus, an air space 16 is formed in the electronics housing 5 in accordance with an embodiment.

Figure 3:
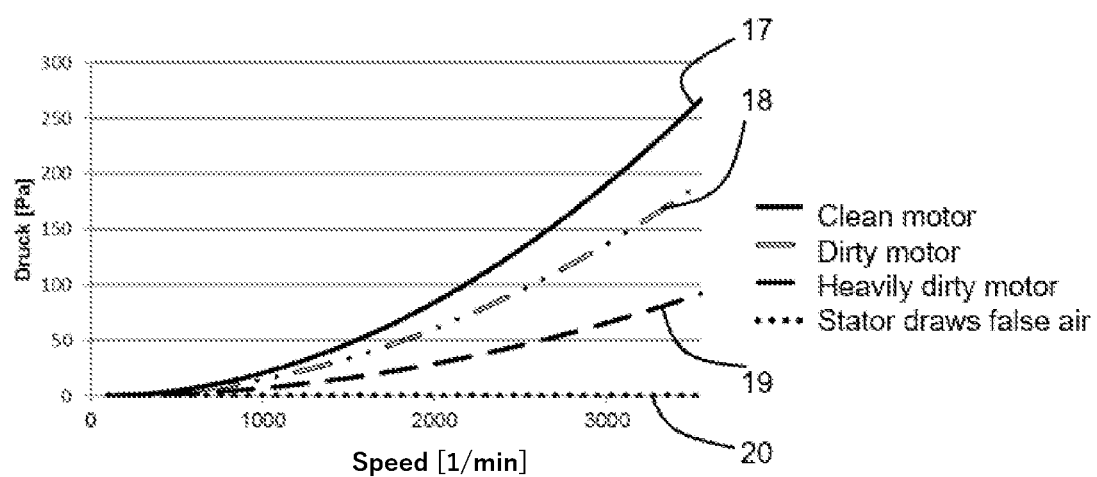

FIG. 3 shows exemplary curves for the negative pressure in the air space 16 as a function of the rotational speed. The topmost curve 17 (solid line) shows the pressure curve with a clean engine. This means that here no or little dirt affects ventilation effects within the electric motor. This state is also referred to here as the "normal state". This curve can be measured, for example, during initial commissioning or during final testing of an electric motor. The second curve 18 (dashed line) shows a dirty engine, the third curve 19 (dashed line) shows a heavily dirty engine. It can be seen that the pressure difference becomes smaller and smaller as a function of rotational speed, the more dirt affects the ventilation effects. Curve 20 (dotted line) shows another state in which the end cover 7 does not sufficiently cover the air space. As a result, the negative pressure created by the ventilation effects can be immediately compensated by air flowing in. It can be seen that the negative pressure practically cannot form even with increasing rotational speed. This can be used to conclude that the engine is sucking "false air".

To determine the pressure in the air space 16, an absolute pressure sensor 21 is arranged in the air space 16 to measure the air pressure in the air space. In the embodiment example according to FIG. 1, this pressure sensor 21 is arranged on the circuit board of the motor electronics 6. The actual pressure difference between air space 16 and environment 15 is detected by the fact that the air pressure of environment 15 is present in air space 16 at a rotational speed n=0 revolutions/min at a time $t_1$. At a measuring time $t_2$ at a rotational speed n≠0 revolutions/min, the same absolute pressure sensor 21 measures the pressure inside the electronics housing. In this way, the actual pressure difference can be calculated from the two measured pressure values at time $t_1$ and at time $t_2$.

Figure 4:
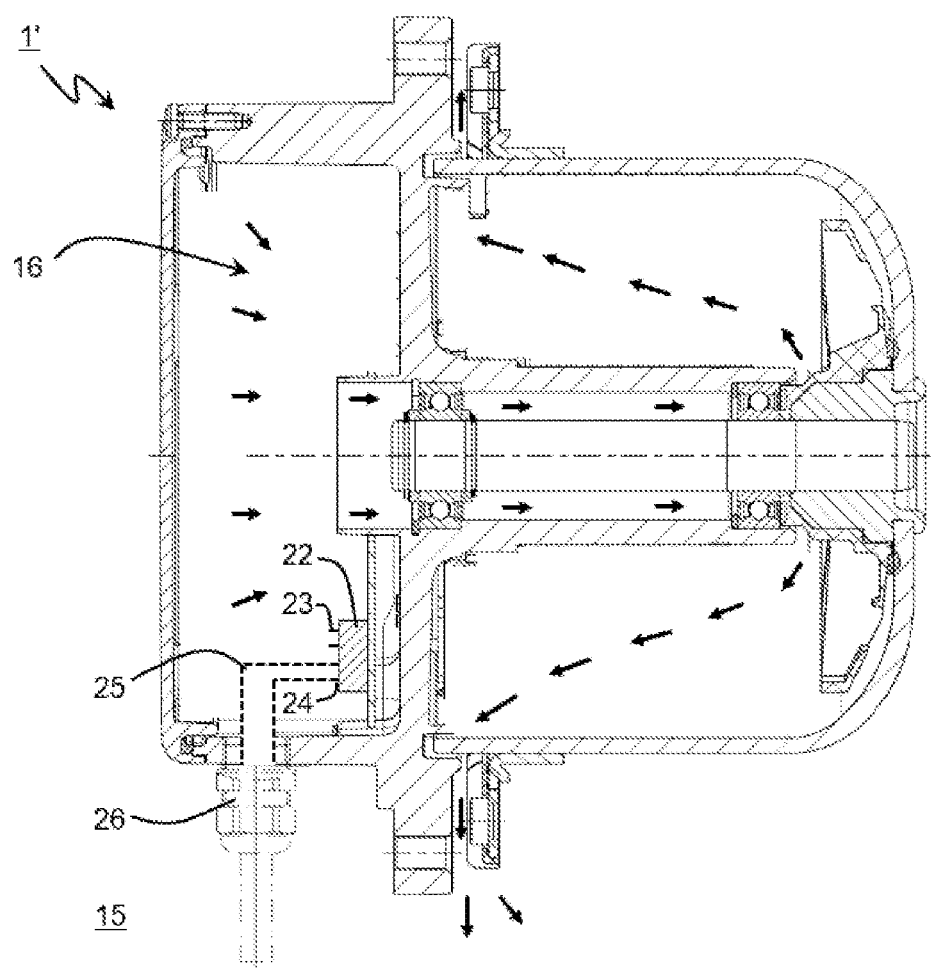

FIG. 4 shows a second embodiment of an electric motor 1' according to the disclosure. This embodiment example is similar in large parts to the first embodiment example, although a differential pressure sensor 22 is now used instead of the absolute pressure sensor 21. The differential pressure sensor 22 includes a first connection 23 and a second connection 24. The first connection 23 directs a pressure input thereto to a first sensor surface, while the second connection 24 directs a pressure input thereto to a second sensor surface. The differential pressure sensor 22 measures the pressure difference between the first sensor surface and the second sensor surface, and thus between the pressure input to the first connection 23 and the pressure input to the second connection 24. In this embodiment, the first connection 23 is pressurized with the air pressure in the air space 16. The second connection 24 is pressurized with an air pressure of the environment 15 via a pressure line 25 and a feedthrough 26.

In this way, the differential pressure sensor 22 can directly measure the actual pressure difference between the air space 16 and the environment 15 without the need for a rotational speed change. However, the rotational speed must then be unequal to 0 revolutions/minute.

Figure 5:
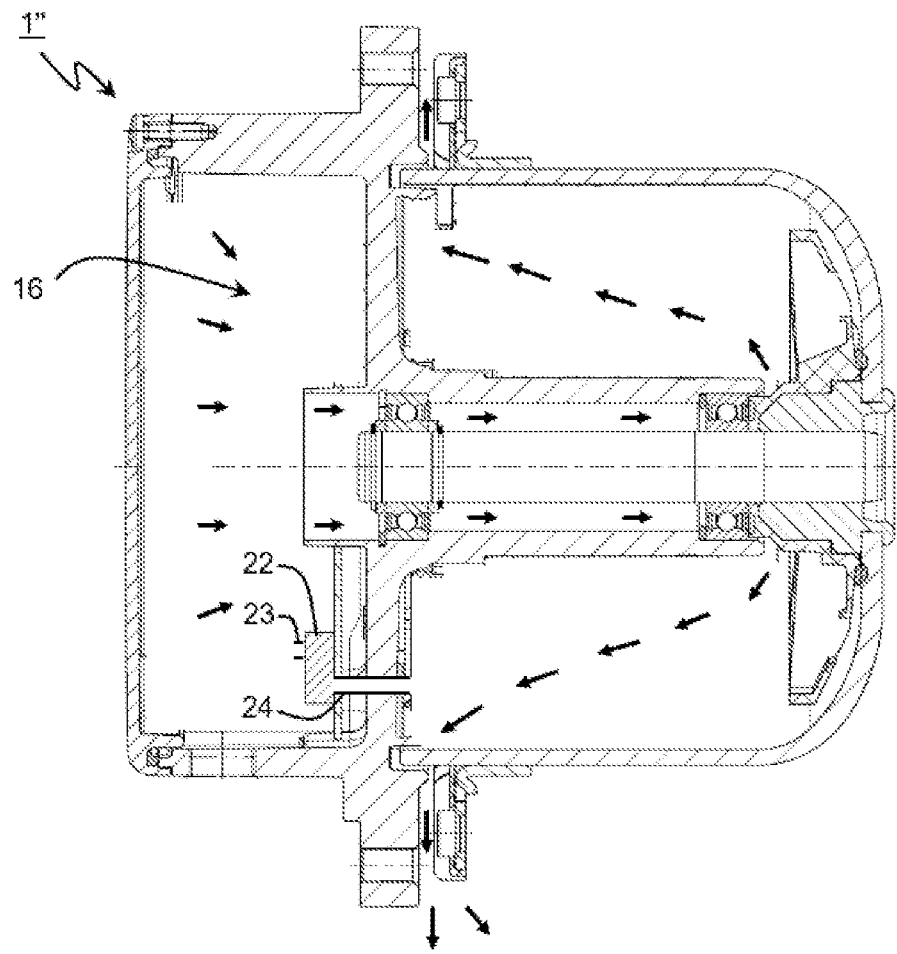

FIG. 5 shows a third exemplary embodiment of an electric motor 1" according to the disclosure, which also uses a differential pressure sensor 22. The first connection 23 of the differential pressure sensor 22 is again subjected to an air pressure in the air space 16. The second connection 24 is arranged on the side of the differential pressure sensor 22 facing the stator bushing 4 and is contacted through the stator bushing 4 into the rotor space. Also in this exemplary embodiment, the differential pressure sensor 22 can determine an actual pressure difference that is dependent on the degree of contamination on the cooling wheel 11 and/or on the area 13.

Figure 6:
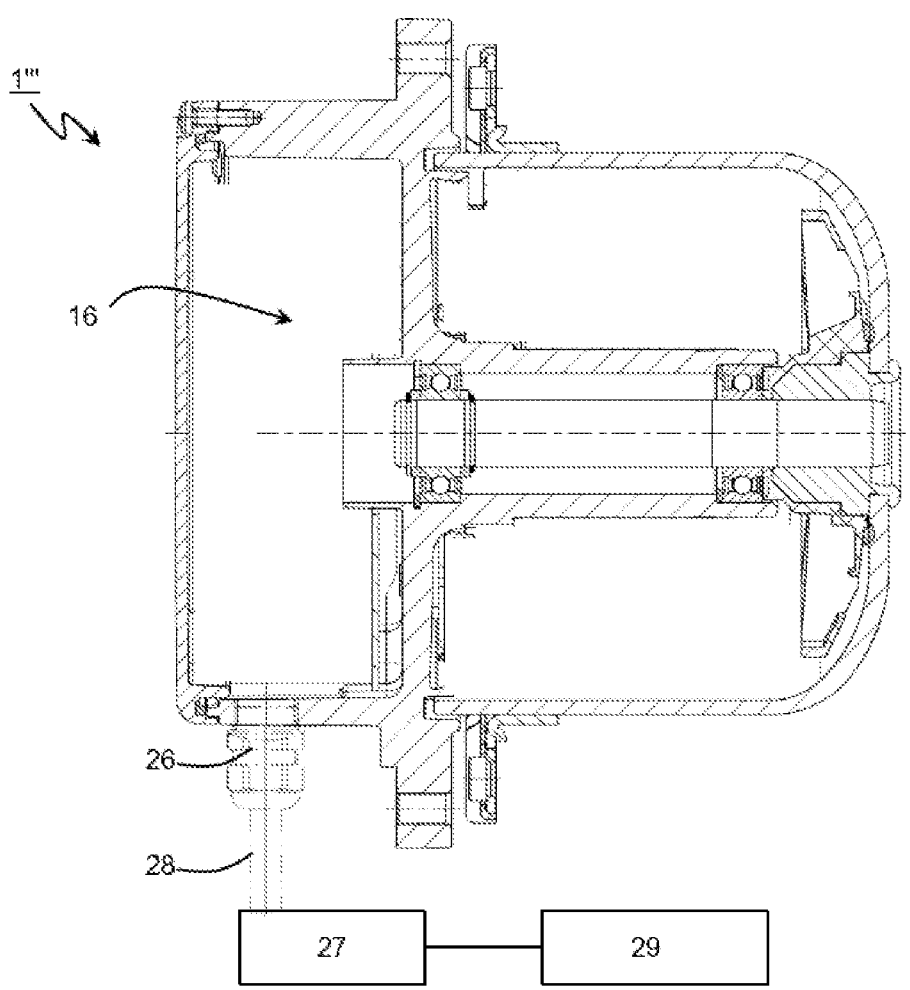

FIG. 6 shows a fourth exemplary embodiment of an electric motor 1''' according to the disclosure. This exemplary embodiment is broadly similar to the other exemplary embodiments. However, instead of the internal pressure sensor 21, 22 within the air space 16, an "external" pressure sensor 27 is used here, which is connected to the air space 16 through a feedthrough 26 via a pressure line 28. Because the air pressure within the air space 16 is approximately equal to an air pressure in a measurement space at the pressure sensor 27 through the pressure line 28, a pressure value representative of the air space 16 can be measured by the pressure sensor 27. Pressure values measured by the pressure sensor 27 are then fed to an evaluation unit 29.

Figure 7:
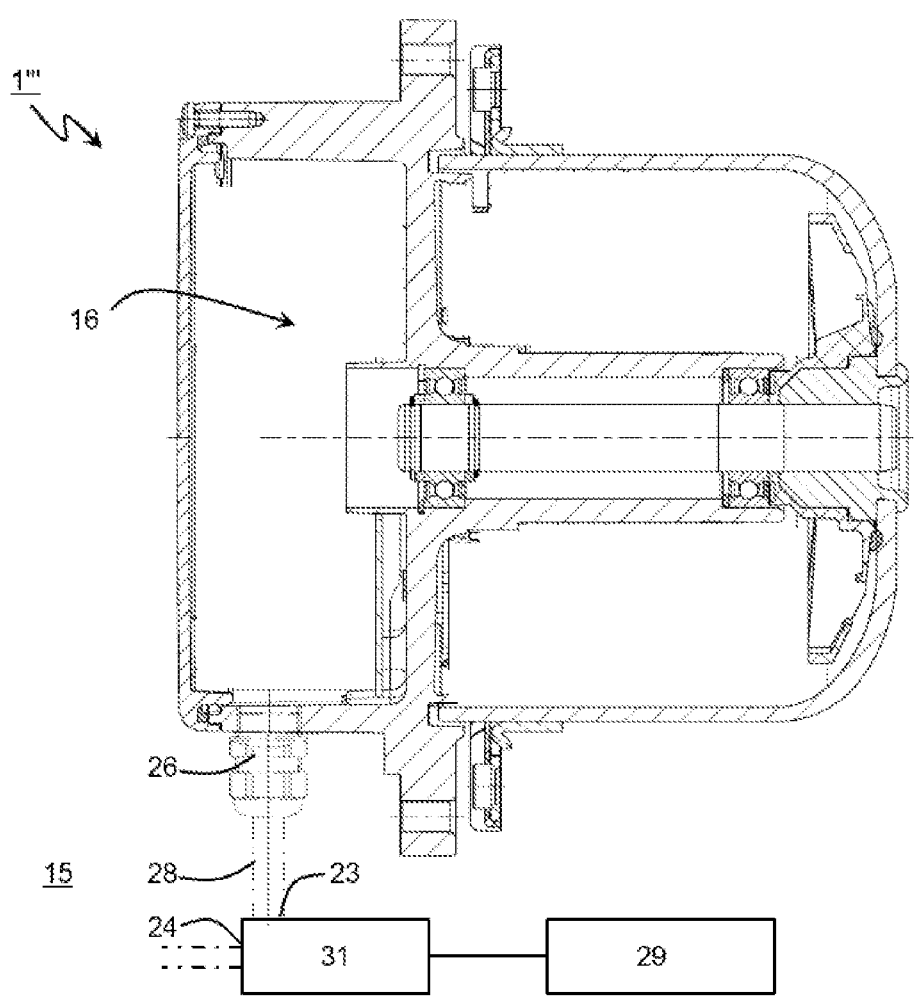

FIG. 7 shows a modification of the fourth exemplary embodiment of an electric motor 1''' according to the disclosure as shown in FIG. 6. The pressure sensor system used here—similar to FIG. 4—is formed by a differential pressure sensor 31. The pressure in the air space 16 is supplied to a first connection 23 of the differential pressure sensor 31 via the pressure line 28, while the air pressure of the environment 15 is applied to a second connection 24. The acquisition of the actual pressure difference corresponds to the description shown in FIG. 4.

Figure 8:
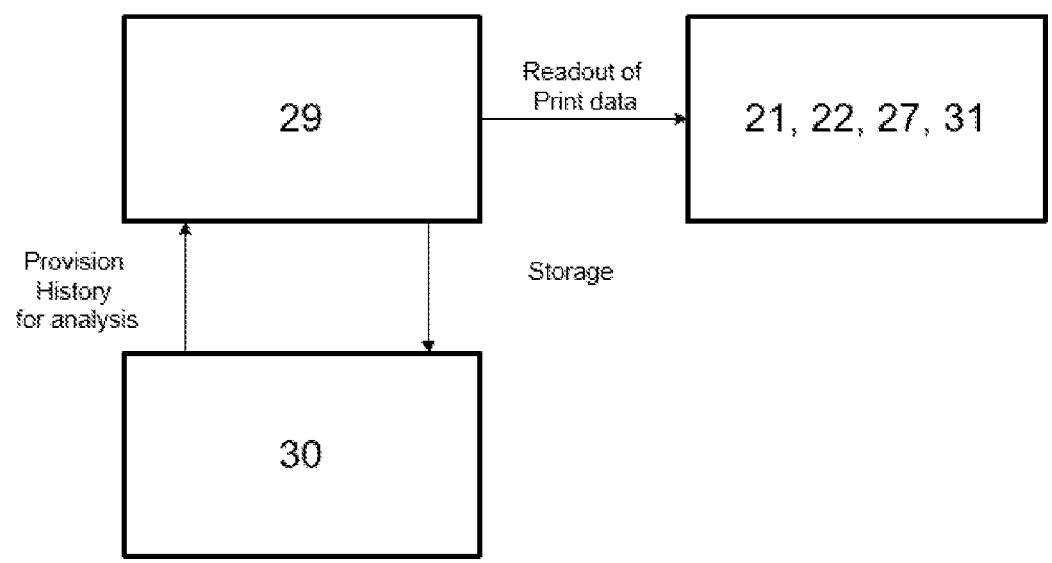

FIG. 8 shows a block diagram with basic functions of a circuit for implementing an exemplary embodiment of a method according to the disclosure. An evaluation unit 29 detects measured values from the pressure sensor 21, 22, 27, 31 or several pressure sensors and relates them to an engine rotational speed n. The evaluation unit 29 can thus assume the role of data handling (communication) and evaluations (analysis). A memory 30 is connected to the evaluation unit 29 and can be used to store the actual pressure difference, the rotational speed, the parameter and/or a specific state. When analyzing current sensor data, the evaluation unit 29 can refer to values stored in the memory 30.

The evaluation unit 29 may be the integrated microprocessor of an EC motor, although the communicative and analytical tasks of the present disclosure can also be performed by external computing units. Examples include: a control device, a PLC (Programmable Logic Controller), a gateway, a cloud computer etc.

The following table shows measured values for a negative pressure p (in Pascal) and the associated rotational speed n. The first column contains the date of the measurement, the fourth column a parameter k, which $$k = \frac{p}{n^2}$$

has been calculated by:

| Measurement | Pressure [Pa] | Rotational speed [1/min] | k [10^-4] |
|---|---|---|---|
| Jan. 1, 2018 | 262 | 2500 | 0.419 |
| Feb. 1, 2018 | 252 | 2500 | 0.403 |
| Mar. 1, 2018 | 240 | 2500 | 0.384 |
| Apr. 1, 2018 | 232 | 2500 | 0.371 |
| May 1, 2018 | 132 | 1950 | 0.347 |
| Jun. 1, 2018 | 210 | 2500 | 0.336 |
| Jul. 1, 2018 | 192 | 2500 | 0.307 |
| Aug. 1, 2018 | 95 | 1950 | 0.250 |

Figure 9:
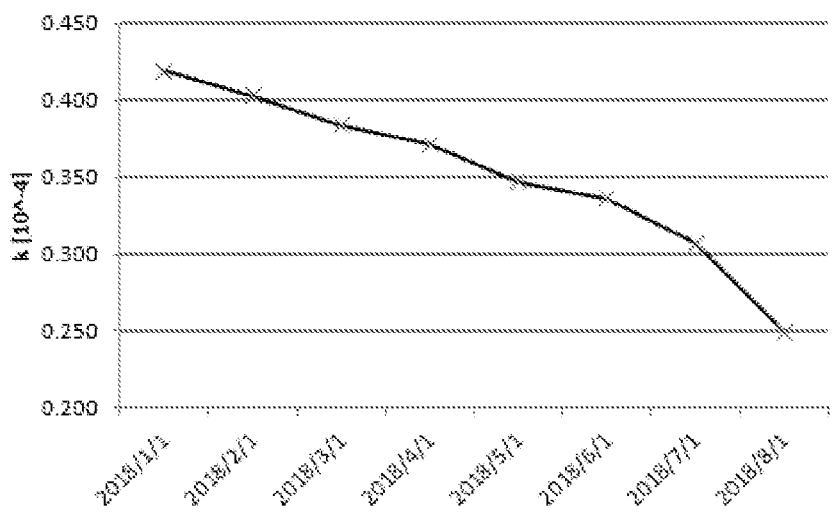

These values of the parameter are plotted in the diagram according to FIG. 9. The parameter k can be understood as a key figure for the cleanliness of the engine. The smaller the value of this parameter k, the lower the cleanliness of the electric motor, or the higher its pollution.

If the electric motor has been put into operation on Jan. 1, 2018, the parameter $k=0.419 \cdot 10^{-4}$ corresponds to a clean motor, a normal state. Threshold values can be defined above which the normal state no longer exists. Threshold values 0.300 and 0.375 can be defined wherein, for example, at 0.300<k<0.375 the engine is classified as "dirty" and at k<0.300 the engine is classified as "heavily dirty". This means that the engine will be in "normal state" until Mar. 1, 2018. On Apr. 1, 2018, the first threshold value will fall below 0.375 for the first time, so that a warning message can indicate a slightly dirty engine. On Aug. 1, 2018, the second threshold value falls below 0.300, so a warning message may indicate a heavily dirty engine.

Figure 10:
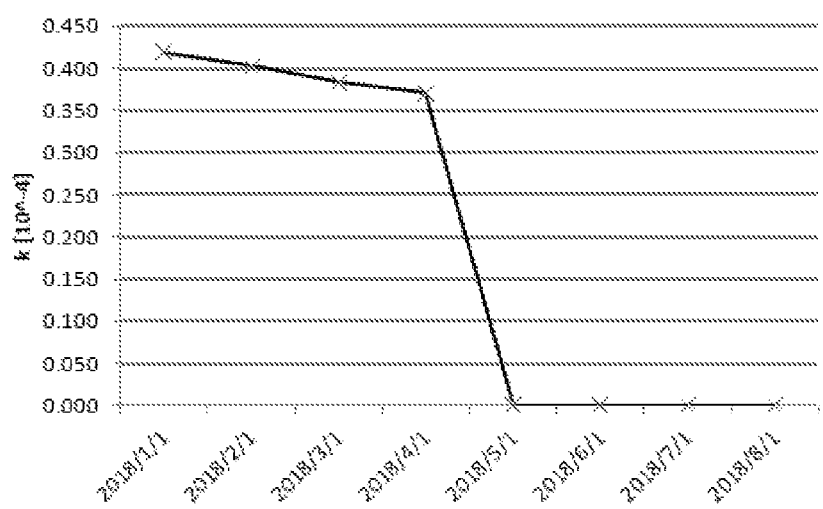
FIG. 10 is a diagram with another example of a time curve of a parameter.

FIG. 10 shows such a different scenario. Mechanical damage occurred between Apr. 1, 2018 and May 1, 2018, causing the engine to draw false air. As a result, the pressure difference is approximately 0. In this scenario, the state "leaking" can be concluded on May 1, 2018. A warning message can trigger maintenance of the electric motor.

With regard to further advantageous embodiments of the method according to the disclosure, the electric motor according to the disclosure and the fan according to the disclosure, reference is made to the general part of the description and to the appended claims in order to avoid repetition.

Finally, it should be expressly noted that the above-described exemplary embodiments serve only to discuss the claimed teaching, but do not limit it to the exemplary embodiments.

LIST OF REFERENCE NUMBERS 1, 1', 1", 1''' Electric motor
2 Stator
3 Rotor
4 Stator bushing
5 Electronics housing
6 Motor electronics
7 End cover
8 Motor axis
9 Bearing
10 Bearing
11 Cooling wheel
12 Motor housing
13 Range (air outlet)
14 Bearing tube
15 Environment
16 Air space
17 Clean motor curve
18 Dirty motor curve
19 Curve for heavily dirty motor
20 Curve with "leaking" motor
21 Absolute pressure sensor
22 Differential pressure sensor
23 First connection
24 Second connection
25 Pressure line
26 Feedthrough
27 External pressure sensor
28 Pressure line
29 Evaluation unit
30 Memory
31 External differential pressure sensor

The invention claimed is:

1. Method for determining a state of an electric motor which has a stator (2) and a rotor (3) mounted rotatably relative to the stator (2), wherein due to a rotational movement of the rotor (3) in an air space (16) inside the electric motor (1, 1', 1", 1''') a pressure difference (p) relative to an environment (15) of the electric motor (1, 1', 1", 1''') is caused, wherein in a normal state of the electric motor (1, 1', 1", 1''') the pressure difference is dependent on an actual rotational speed (n) of the rotor (3), comprising the steps:
   determining an actual pressure difference (p) between the air space (16) and an environment (15) of the electric motor (1, 1', 1", 1'''),
   determining the actual rotational speed (n) of the rotor (3), and
   calculating a parameter (k) based on the actual pressure difference (p) and the actual rotational speed (n), resulting in a parameter (k) representative of the state of the electric motor;
   wherein the parameter (k) is standardized to a reference value, wherein the reference value is determined during initial commissioning of the electric motor or during a final test after production of the electric motor.

2. The method according to claim 1, wherein the parameter (k) is compared with a threshold value and in that a state of the electric motor (1, 1', 1", 1''') is determined based on a result of the comparison of the parameter (k) with the threshold value.

3. The method according to claim 1, wherein the parameter (k) is calculated as a quotient of the actual pressure difference (p) and a square of the actual rotational speed (n).

4. The method according to claim 1, wherein the actual pressure difference (p) is determined based on pressure values (p) which are measured by means of an absolute pressure sensor (21, 27) for the air space (16) at different actual rotational speeds, wherein a first measurement is carried out when the electric motor (1, 1") is at a standstill and a second measurement is carried out at an actual rotational speed not equal to 0.

5. The method according to claim 1, wherein the actual pressure difference (p) is measured by means of two absolute pressure sensors, wherein a first absolute pressure sensor (21, 27) is subjected to a pressure in the air space (16) and a second absolute pressure sensor measures an air pressure representative of the pressure in the environment of the electric motor.

6. The method according to claim 1, wherein the actual pressure difference (p) is measured by means of a differential pressure sensor (22, 31), wherein a first sensor surface of the differential pressure sensor (22, 31) is subjected to a pressure in the air space and a second sensor surface of the differential pressure sensor (22) is subjected to a pressure in the environment (15) of the electric motor (1', 1", 1''').

7. The method according to claim 1, wherein the determined state of the electric motor (1, 1', 1", 1''') describes a contamination of the electric motor (1, 1', 1", 1''') or a leakage of the electric motor (1, 1', 1", 1''').

8. The method according to claim 1, wherein, when determining the actual pressure difference over a measurement period, a plurality of pressure differences are determined, and the actual pressure difference is calculated from the plurality of pressure differences by averaging.

9. An electric motor, with a stator (2), a rotor (3) mounted rotatably relative to the stator (2) and an air space (16) formed inside the electric motor, wherein in a normal state of the electric motor (1, 1', 1", 1'''), the rotor (3), due to its rotational movement, causes a pressure difference in the air space (16) with respect to an environment (15) of the electric motor (1, 1', 1", 1'''), wherein the electric motor (1, 1', 1", 1''') additionally comprises: a pressure sensor system, a rotational speed determination system and an evaluation unit (24), wherein the pressure sensor system is designed for determining an actual pressure difference (p) between an environment (15) of the electric motor (1, 1', 1", 1''') and the air space (16), wherein the rotational speed determination system is designed to determine an actual rotational speed (n) of the rotor (3), and wherein the evaluation unit (29) is designed to determine a parameter (k) representative of a state of the electric motor (1, 1', 1", 1''') on the basis of the actual pressure difference (p) and the actual rotational speed (n) and wherein the parameter (k) is standardized to a reference value, wherein the reference value is determined during initial commissioning of the electric motor or during a final test after production of the electric motor.

10. An electric motor according to claim 9, further comprising a cooling wheel (11) is coupled to the rotor (3), wherein the cooling wheel (11) causes the pressure difference in the air space (16).

11. An electric motor according to claim 9, further comprising an air outlet (13), with ribs of the stator or the rotor or a labyrinth gap, wherein a degree of contamination of the air outlet (13) influences the actual pressure difference in the air space (16).

12. An electric motor according to claim 9, wherein the pressure sensor system is formed by an absolute pressure sensor (21, 27) with a rotational speed-based calculation unit, two absolute pressure sensors or a differential pressure sensor (22, 31).

13. An electric motor according to claim 9, wherein the air space (16) is formed in an electronics housing (5) formed in or on the electric motor (1, 1', 1", 1'''), wherein the electronics housing (5) preferably is formed on a stator bushing (4) of the electric motor (1, 1', 1", 1''').

14. An electric motor according to claim 9, wherein the electric motor (1, 1', 1", 1''') is an EC motor (Electronically Commutated Motor) or an external rotor motor.

15. An electric motor according to claim 9, further comprising a communication unit which is designed to send state information obtained by means of an evaluation unit (29) to a management unit.

16. An electric motor according to claim 15, further comprising a memory (30), wherein state information, parameters, or further variables derived therefrom are stored in the memory (30) by means of the evaluation unit (29).

17. An electric motor according to claim 9, wherein the rotor (3) of the electric motor (1, 1', 1", 1''') is coupled to an impeller of a fan.

* * * * *